Nov. 3, 1931.  P. E. FLUOR  1,829,744

COOLING TOWER

Filed Jan. 12, 1927  2 Sheets-Sheet 1

Inventor:
Peter E. Fluor,
by Hazard and Miller
Attorneys

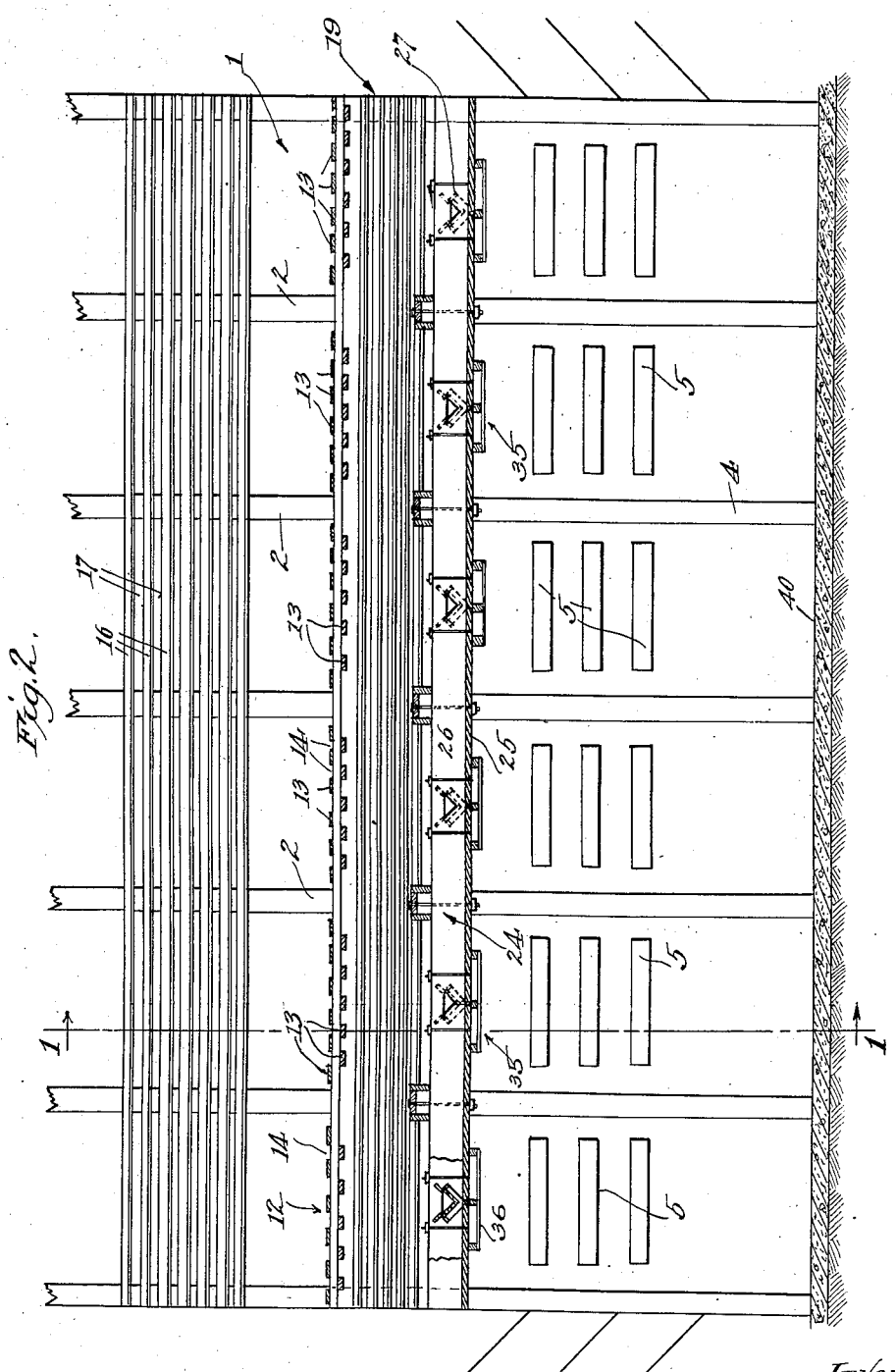

Patented Nov. 3, 1931

1,829,744

UNITED STATES PATENT OFFICE

PETER E. FLUOR, OF LOS ANGELES, CALIFORNIA, ASSIGNOR TO FLUOR CONSTRUCTION CO., OF LOS ANGELES, CALIFORNIA, A CORPORATION OF CALIFORNIA

COOLING TOWER

Application filed January 12, 1927. Serial No. 160,616.

My invention is a cooling tower to cool water by the water dripping downwardly through the tower and in addition I utilize the water after being cooled to operate on coils of cooling pipes in order to cool the liquids or gases in the pipes.

An object of my invention is the construction of a cooling tower which may be made in a set of multiple towers and having the water, after being cooled, collected and then redistributed over cooling coils or the like in order to cool gases or liquids passing through said pipes.

A special feature of my invention is in the construction for cooling the water at the base of the tower and redistributing the water to give an even spray or drip over the pipes or coils to be cooled.

Another feature of my invention is the use of wind deflectors to catch the water carried by the wind in traversing the tower, and separate the water from the air so that the water is not carried over the tower and thereby lost.

In general the features of my invention comprise a tower which utilizes an economy of material in its manufacture and by various instrumentalities subjects the dripping water to air currents to cool the water without undue waste of the water and collects the cooled water for spraying over cooling pipes, coils or the like.

My invention will be more readily understood from the following description and drawings, in which:

Figure 2 is a longitudinal section of the tower, as if taken on the line 2—2 of Fig. 1.

Figure 1:
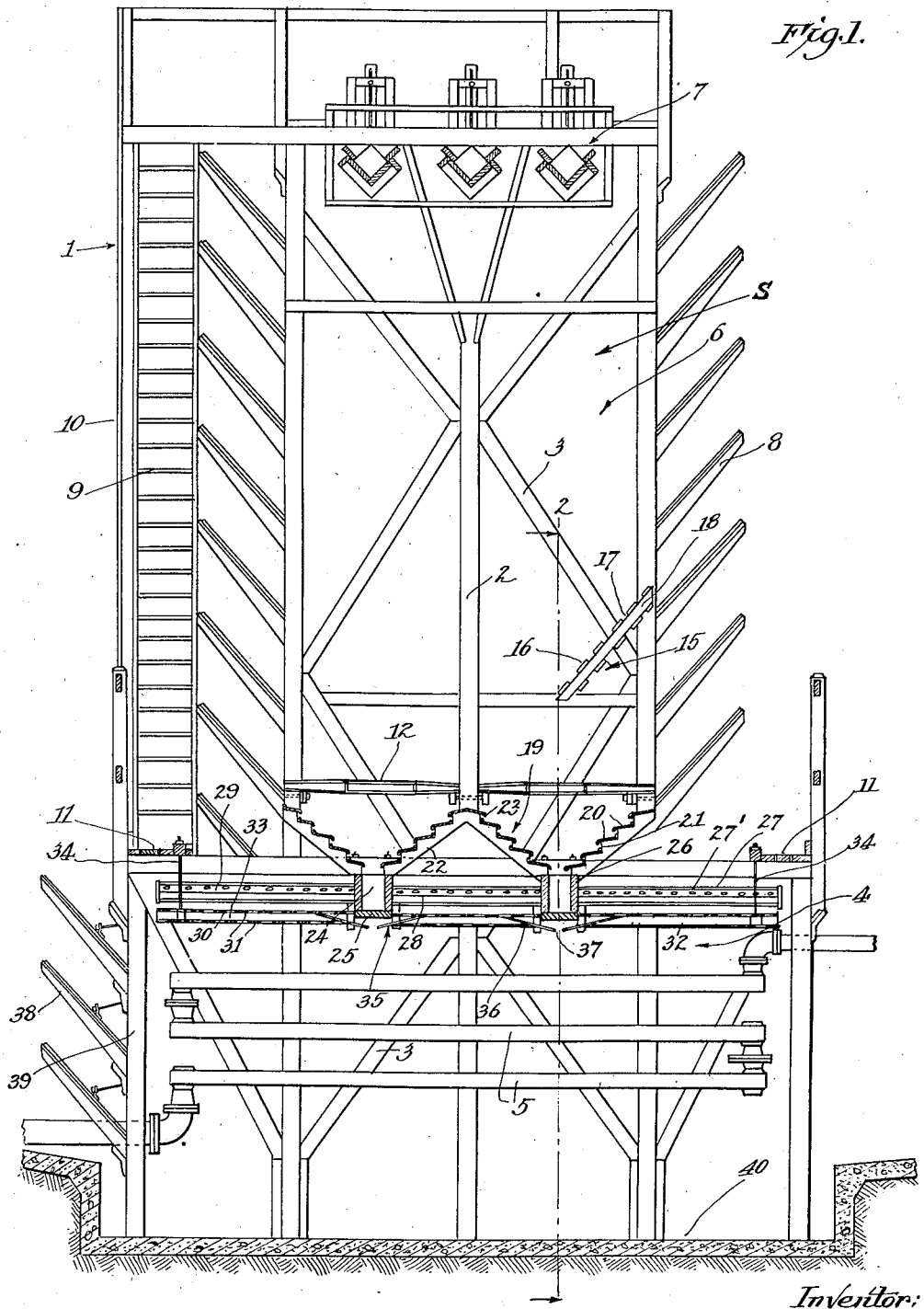
Figure 1 is a transverse section through the tower, as if taken on the line 1—1 of Fig. 2.

The tower as a whole may be considered as built up of a plurality of units 1, there being posts or columns 2 forming a series of supports for the framing 3 of the tower. These posts are located in bents and situated lengthwise of the structure. The tower construction between each bent may be considered as an independent unit although they all operate together when built up in a structure in multiple.

The tower is provided with a substructure, designated generally by the numeral 4, in which is located a series of cooling coils 5, these being formed of pipes having bends or any other suitable piping system in which liquids or gases may flow, an object being to cool such liquids or gases in the pipes. The superstructure, designated generally by the numeral 6, has the arrangement for cooling the water and at the top comprises a series of distributing troughs 7 which run lengthwise of the superstructure and receive the water which is to overflow and drop through the tower. This water overflows the upper edges of the troughs and drops downwardly, the water being spread laterally by suitable spreading decks. The construction of the troughs, decks and louvers may be substantially similar to that set forth in the patent of John Simon Fluor, 1,593,252 dated July 20, 1926, for atmospheric cooling tower trough, Patent 1,624,324 dated April 12, 1927, for atmospheric cooling tower, or his Patent 1,632,397, dated June 14, 1927, for cooling tower.

The superstructure is provided with a set of longitudinal louvers 8 which are of the usual construction and may be considered as defining cooling chamber S. It will be seen that air currents admitted between the louvers pass across the cooling chamber. A ladder 9, having a hand rail 10, allows access from the foot walk 11 to the top of the tower outside of the louvers. One or more water spreading decks 12 are located in the cooling chamber of the towers or tower units and have transverse boards 13 positioned one above the other, the boards being spaced apart as at 14 so that a lower board covers the space between the upper boards and an upper board covers the space between the lower sets of boards. These boards are arranged transversely and the decks extend the length of the multiple units.

Above such decks is located a wind deflector 15 which is constituted of a plurality of longitudinal boards 16 in two or more depths with spaces 17 between the boards. These boards preferably run lengthwise of the tower and are preferably arranged on diagonal joists 18 or the like. These wind deflectors are positioned on the leeward side of the tower in reference to the prevailing wind so that the water carried by the wind blowing across the tower is caught by the boards and drips downwardly, the air being allowed to pass through the spaces between the different layers of boards. By this construction the water is practically separated from the wind and not lost. This wind deflector is in addition to the louvers 8 and may be considered as an apertured baffle inclined with respect to horizontal decks 12 and, in contradistinction to the louvers, disposed in the path of the falling water.

Pick up racks 19 are located below the water decks 12 and extend longitudinally of the set of towers. These comprise longitudinal boards 20 arranged in steps, the boards in effect forming a tread and the space 21 between the boards a riser. Boards 20 may be considered as being vertically spaced apart in stepped and horizontally overlapped relation. These pick up racks are preferably arranged in duplicate for a tower having three posts to a bent and the boards are secured on any suitable kind of a stepped framing 22. The air may pass through the space at the risers and it is preferable to have the steps or treads inclined with a downwardly extending drip edge 23 on the front of each of the treads, and a raised edge 23' at the rear of the treads.

Longitudinal pick up flumes 24 extend lengthwise of the pick up racks, there being a flume for each pair of racks. The drawings which show three posts to a bent and two racks have two flumes. These flumes are of simple construction having a base board 25 and two side boards 26. The flumes may have a certain pitch or inclination if desired or may be horizontal. From the above construction it will be seen that substantially all the water which flows from the troughs 7 is collected in the flumes 24, except such as may be evaporated or carried away in a fine mist.

The water spreads for distributing the water over the cooling pipes are constructed substantially as follows:

A series of lateral distributing troughs 27, having apertures 27', are connected to the sides of each of the flumes. These troughs are positioned between each bent of posts and thus extend transversely of the tower. The center troughs 28 are preferably connected to both of the flumes and the side troughs 29 extend from the outside of the flumes to the outside of the substructure. These troughs may be of any suitable type but are preferably made in accordance with the patents above mentioned.

Positioned below each of the distributing troughs are water decks 30 to spread or distribute the water over the cooling coils. These decks which are preferably formed by upper and lower boards 31 running lengthwise of the tower construction, are of sufficient length to distribute the water over the cooling coils positioned immediately below and between each bent of the posts, the boards being secured to transverse beams 32 and there being longitudinal spaces 33 between the boards. The beams are preferably hung by bolts 34 or the like. In conjunction with the water decks or spreads there is provided a plurality of water catching devices 35 which are formed of inclined boards or the like 36 which catch the water flowing out of the troughs 27, allowing this water to drip through openings 37 directly below the flumes 24. By this construction a flow of water is provided dripping on the cooling coils directly below the flumes.

The substructure is provided with a plurality of louvers 38 secured to short columns 39 on each side of the outside series of posts. These form an inclosure for the cooling coils and prevent the wind from blowing the water passing over the coils away. The water is collected in a suitable tank 40 or the like excavated in the ground. It is not necessary to describe the particular form of cooling coils to which my tower is adapted as such constructions vary materially and the use of my tower is not confined to any one type of cooling coil or arrangement.

From the above description it will be seen that I have developed a comprehensive cooling tower construction which adequately distributes the water at the top of the tower, controls the flow of the water downwardly, and prevents the wind from blowing an excess amount away. The tower collects the chilled water and spreads or distributes such water over the different sets of cooling coils.

It will be noted in my construction of a cooling tower that no matter which direction the wind blows from it is caught by the louvers and some of it is directed downwardly so that there is a flow of a large amount of air over and through the pick up racks and, as these racks are formed in steps open at the front and back, the water is subjected to efficient cooling. The water dripping over the cooling coils is also subjected to the action of the wind, this also functioning in cooling the water and also the coils.

Various changes may be made in the principles of my invention without departing from the spirit thereof, as set forth in the description, drawings and claims.

I claim:

1. An atmospheric cooling tower having a substructure and a superstructure, with means to drip water at the top of the superstructure, pick up racks in the base of the superstructure having flumes connected thereto, water decks forming spreaders below the flumes, means to convey water from the flumes over said decks, and cooling coils in the substructure below the water decks.

2. An atmospheric cooling tower having a substructure and a superstructure, with means to drip water from the top of the superstructure, pick up racks adjacent the base of the superstructure having flumes connected thereto, lateral distributing troughs connected to the flumes, water distributing decks below the troughs, and cooling coils in the substructure below the water decks.

3. An atmospheric cooling tower, as claimed in claim 2, the flumes running lengthwise of the tower and the distributing troughs crosswise, and water catching devices positioned below the flumes to catch some of the water and drip same from below the flumes onto the cooling coils.

4. An atmospheric cooling tower having a substructure and a superstructure, means at the top of the superstructure to drip water, spreader decks adjacent the bottom of the superstructure, pick up racks below the decks, flumes running lengthwise of the tower connected to the racks, transverse distributing troughs leading sidewise from the flumes, distributing decks below the troughs, and cooling coils below the distributing decks.

5. In an atmospheric cooling tower a supporting structure having means to drip water from the top, a plurality of pick up racks extending longitudinally of the tower adjacent the base, said racks having a plurality of sets of steps, each set converging at the bottom, a flume at the base of each set of racks collecting the water therefrom, transverse lateral troughs connected to the flumes and interconnecting each of the flumes, and means to spread the water discharged from the troughs.

6. An atmospheric cooling tower comprising in combination a plurality of posts constructed in separate bents and having a framing there-between, means at the upper part of the tower to drip water, a plurality of pick up racks formed of boards in steps, said racks extending lengthwise of the tower adjacent the base, a flume extending lengthwise of the tower for each of the pick up racks to carry the water so collected, transverse lateral troughs connected to the flumes between each of the bents, water spreader decks below each of the troughs, and a set of cooling coils below each of the spreader decks.

7. An atmospheric cooling tower, as claimed in claim 6, having in addition wind deflectors extending longitudinally of the tower on the leeward side and inside the outside row of posts, said deflector being inclined inwardly and downwardly and having a plurality of layers of boards, the boards of each layer being spaced apart, the boards of one layer forming a cover for the spaces of the other layer.

8. An atmospheric cooling tower having a substructure and a superstructure, means at the top of the superstructure to drip water, spreader decks adjacent the bottom of the superstructure, a wind deflector above the spreader decks and extending in a longitudinal direction of the superstructure, said deflector being composed of boards in a plurality of separate layers, the boards of each layer being spaced apart and the wind deflector being inclined inwardly and downwardly, pick up racks below the decks, flumes running longitudinally of the tower connected to the racks, transverse distributing troughs leading sideways from the flumes, distributing decks below the troughs, and cooling coils below the distributing decks.

In testimony whereof I have signed my name to this specification.

PETER E. FLUOR.

CERTIFICATE OF CORRECTION.

Patent No. 1,829,744.

Granted November 3, 1931, to

PETER E. FLUOR.

It is hereby certified that error appears in the printed specification of the above numbered patent requiring correction as follows: Page 3, lines 40 and 41, claim 6, for the words "constructed in" read forming; and that the said Letters Patent should be read with this correction therein that the same may conform to the record of the case in the Patent Office.

Signed and sealed this 17th day of May, A. D. 1932.

(Seal)

M. J. Moore,
Acting Commissioner of Patents.